(12) United States Patent
    Merciu

(10) Patent No.: US 10,697,286 B2
(45) Date of Patent: Jun. 30, 2020

(54) METHOD OF IDENTIFYING A MATERIAL AND/OR CONDITION OF A MATERIAL IN A BOREHOLE

(71) Applicant: STATOIL PETROLEUM AS, Stavanger (NO)

(72) Inventor: Ioan-Alexandru Merciu, Hommelvik (NO)

(73) Assignee: STATOIL PETROLEUM AS, Stavanger (NO)

(*) Notice: Subject to any disclaimer, the term of this patent is extended or adjusted under 35 U.S.C. 154(b) by 313 days.

(21) Appl. No.: 15/570,085

(22) PCT Filed: Apr. 29, 2016

(86) PCT No.: PCT/NO2016/050077
    § 371 (c)(1),
    (2) Date: Oct. 27, 2017

(87) PCT Pub. No.: WO2016/175662
    PCT Pub. Date: Nov. 3, 2016

(65) Prior Publication Data
    US 2018/0128094 A1    May 10, 2018

(30) Foreign Application Priority Data
    Apr. 30, 2015 (GB) .................. 1507409.9

(51) Int. Cl.
    *G01V 1/50*    (2006.01)
    *E21B 47/00*   (2012.01)

(52) U.S. Cl.
    CPC ............ *E21B 47/0005* (2013.01); *G01V 1/50* (2013.01)

(58) Field of Classification Search
    CPC ......... G01V 1/50; G01V 1/40; E21B 47/0005
    See application file for complete search history.

(56) References Cited

U.S. PATENT DOCUMENTS

| 4,217,659 A | 8/1980 | Glenn, Jr. |
| 4,802,145 A | 1/1989 | Mount, II |

(Continued)

FOREIGN PATENT DOCUMENTS

| GB | 2528326 A | 1/2016 |
| GB | 2537292 A | 10/2016 |
| WO | WO 2015/023384 A1 | 2/2015 |

OTHER PUBLICATIONS

Combined Search and Examination Report, issued in United Kingdom application No. 1507409.9, dated Jul. 24, 2015.

(Continued)

*Primary Examiner* — Ian J Lobo
(74) *Attorney, Agent, or Firm* — Birch, Stewart, Kolasch & Birch, LLP

(57) ABSTRACT

A method of identifying a material and/or condition of a material in a borehole is described, together with related apparatus. The material may either be between first and second tubulars or between a first tubular and a wall of the borehole. The method may include providing a reference quality factor ($Q_{reference}$) for one or more known materials in one or more known conditions and measuring a downhole quality factor ($Q_{measured}$) of the material and/or material condition to be identified. A spectral ratio $\alpha = (Q_{measured}/Q_{reference})$ may then be computed for one or more known materials under one or more known conditions followed by an analysis of the spectral ratios to identify the material and/or condition of the material in the borehole.

14 Claims, 9 Drawing Sheets

(56) References Cited

U.S. PATENT DOCUMENTS

| | | | |
|---|---|---|---|
| 5,874,676 A | 2/1999 | Maki, Jr. | |
| 6,938,469 B2* | 9/2005 | Ganesan | E21B 49/10 |
| | | | 324/303 |
| 2007/0019506 A1 | 1/2007 | Mandal et al. | |
| 2009/0168597 A1 | 7/2009 | Wu et al. | |
| 2010/0107754 A1 | 5/2010 | Hartog et al. | |
| 2013/0114377 A1 | 5/2013 | Frisch | |
| 2014/0177389 A1 | 6/2014 | Bolshakov et al. | |
| 2015/0085611 A1 | 3/2015 | Mandal | |
| 2015/0198732 A1 | 7/2015 | Zeroug et al. | |
| 2015/0218930 A1 | 8/2015 | Zeroug et al. | |

OTHER PUBLICATIONS

Examination Report, issued in United Kingdom application No. 1507409.9, dated Jan. 9, 2017.
Examination Report, issued in United Kingdom application No. 1507409.9, dated May 23, 2017.
International Search Report, issued in PCT/NO2016/050077, dated Jul. 25, 2016.
Written Opinion of the International Searching Authority, issued in PCT/NO2016/050077, dated Jul. 25, 2016.

* cited by examiner

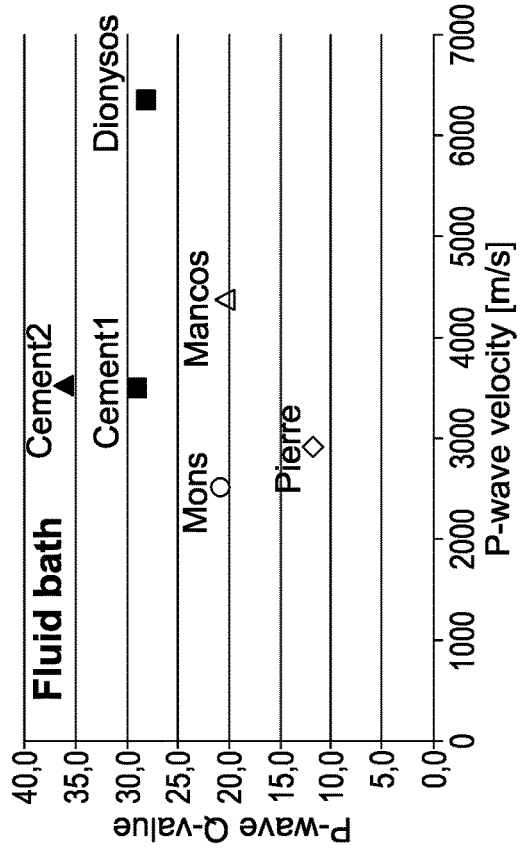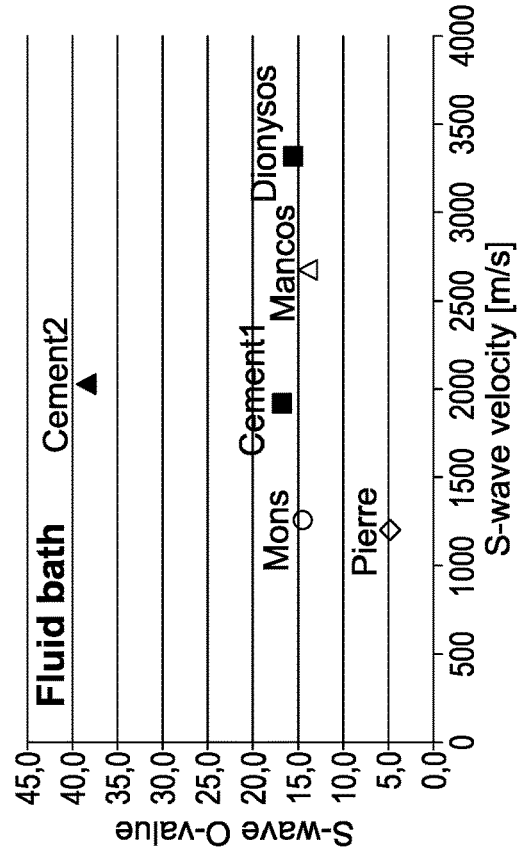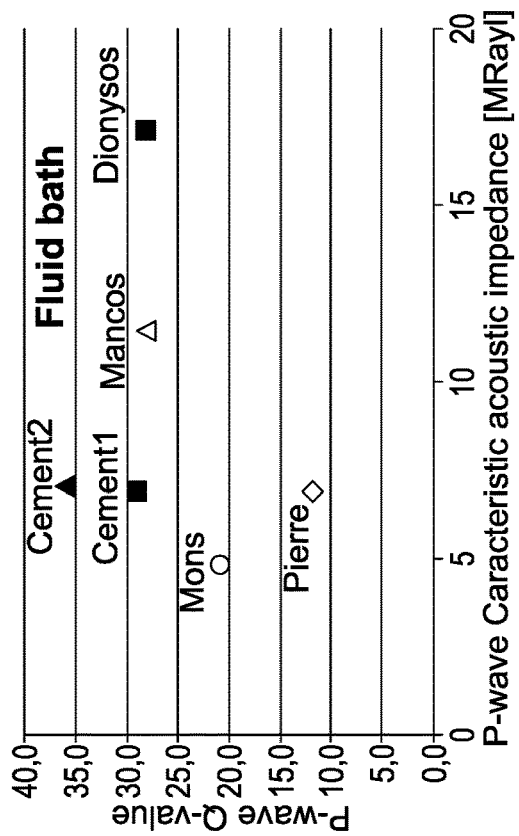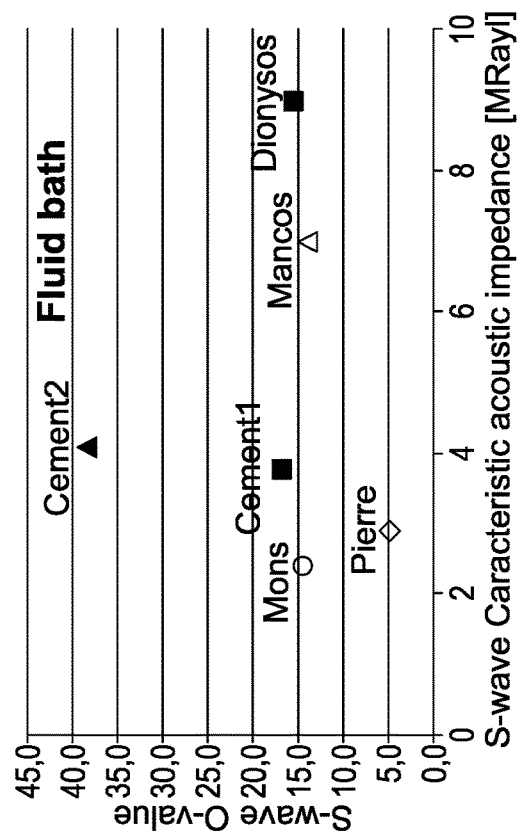

METHOD OF IDENTIFYING A MATERIAL AND/OR CONDITION OF A MATERIAL IN A BOREHOLE

TECHNICAL FIELD

The present invention relates to the surveying of a borehole, and in particular, to a method of identifying a material and/or condition of a material in a borehole. In particular variants, the invention relates to determining the quality of a cement bond either between first and second tubulars or between a first tubular and a wall of the borehole.

BACKGROUND

Boreholes are formed in the subsurface of the Earth in many contexts. They provide access to the interior of the Earth's crust, as may be desirable for example to construct a well to extract fluids from geological formations in the Earth, or perhaps to explore or make measurements of the subsurface. The borehole is drilled using drilling equipment and is typically cased or lined with tubular sections of casing or lining. The casing or lining can help to support and stabilise the geological formation into which the borehole is drilled in order to prevent collapse of the formation. It may also help to prevent fluid pressure loss or build up in the borehole, which can be important for safely performing further borehole operations such as drilling.

In order to case the borehole, an initial casing (i.e. tubular) is inserted at a desired location in a drilled section of the borehole. Cement is pumped and injected into the borehole to enter the space (annulus) surrounding the inserted casing. The cement circulates up along the outside of the casing in the annulus between the casing and the formation, and is left to set and harden to secure the casing in place.

At more advanced stages, a further casing may be installed. The further casing has a smaller internal diameter and is inserted radially within the initial casing, approximately concentrically therewith forming an annular space between the inner surface of the initial casing and an outer surface of the further casing. The further casing is installed in the same way as the initial casing, with cement pumped into the borehole and forced up through the annular space between the initial and further casing.

In this way, a multi-cased region can be defined in the borehole where the borehole has a wall structure including multiple layers of casing spaced apart from each other in a radial direction with respect to the borehole long axis, toward the formation.

A difficulty with the casing process in practice is that cement may not completely or perfectly fill the annular spaces surrounding the casings. Accordingly, there may be gaps where cement has not reached, and potential pathways for fluid from the formation to leak into the borehole, or vice versa, which can create problems for pressure control in the borehole. In addition, if a borehole or well is to be abandoned the borehole is required to be plugged to prevent leakage of fluid from the formation to the surface. Cement plugs can be acceptable for this purpose, but must comply with stringent leakage and pressure containment requirements. For example, a permanent well barrier may be required to have some or all of the following properties: 1) impermeability; 2) long term integrity; 3) non-shrinking; 4) ductile (i.e. non-brittle and able to withstand mechanical loads/impacts); 5) resistance to chemicals/substances (e.g. $H_2S$, $CO_2$ and hydrocarbons); and 6) wetting, to ensure bonding to steel.

It is known to assess the quality of the cementation and whether the cement is adhered solidly to the surfaces of the casing in a logging operation. Sonic logging tools have been used for this purpose. A more recent technique is to obtain cement evaluation logs, which give detailed 360-degree representations of the integrity of the cementation.

In some techniques, variations in amplitude of an acoustic signal travelling in the casing wall between a transmitter and a receiver are detected and used to determine the quality of the cement bond on the exterior casing wall. The fundamental principle of this determination is that the acoustic signal is more attenuated in the presence of cement than if the casing were not cemented. This technique has limitations in that the measurement is largely qualitative, as there is no indication of azimuthal cement variations such as channelling and as it is sensitive to the effect of a micro-annulus.

Pulse echo techniques have been developed where an ultrasonic transducer, in transmit mode, emits a high-frequency acoustic pulse towards the borehole wall, where it is reflected back to the same transducer operating in receive mode. The measurement consists of the amplitude of the received signal, the time between emission and reception, and sometimes the full waveform received. Tools that use this technique either have multiple transducers, facing in different directions, or rotate the transducer while making measurements, thereby obtaining a full image of the borehole wall. In cased hole, the waveform is analysed to give indications of cement-bond quality and casing corrosion.

In addition, it is known to excite flexural waves in the casing, obtain an amplitude signal and use the attenuation of the signal to determine properties of the material, whether that be a solid (e.g. cement), liquid or gas, adjacent to the casing.

It is known to generate flexural waves of this type using an ultrasonic pulse-echo tool with a transmitter arranged to transmit a pulse obliquely incident with respect to the casing and a receiver arranged to receive reflections or echoes of the pulse from interfaces in the borehole wall.

However, existing technology is not able to quantify the quality of a cement plug in an interval between two surfaces, taking into account the bond with both surfaces simultaneously. Furthermore, existing technology does not take into account the scattering and absorption of a signal along the path in the analysed layer by means of taking into account both types of attenuation: share wave attenuation and flexural wave attenuation. In addition, the quality of a cement bond is not currently defined in terms of intrinsic properties of the material.

It is therefore an aim of the present invention to provide a method of identifying a material and/or condition of a material in a borehole that helps to address the above-mentioned deficiencies.

SUMMARY OF THE INVENTION

Aspects of the present invention emerged from analysis of the results in "Non-destructive evaluation of concrete by quality factor"; Jamal Rhazi and Serge Kodjo; International Journal of Physical Sciences Vol. 5 (16), pp 2458-2465, 4 Dec. 2010. Although this paper relates to analysis of concrete primarily used in the construction industry, the present inventors realised that a similar technique could be advantageously applied in the oil and gas industry to analyse cement bond quality in a borehole.

According to a first aspect of the invention there is provided a method of identifying a material and/or condition of a material in a borehole, the material being either between first and second tubulars or between a first tubular and a wall of the borehole, the method comprising the steps of:

(a) providing a reference quality factor ($Q_{reference}$) for one or more known materials in one or more known conditions;
(b) measuring a downhole quality factor ($Q_{measured}$) of the material and/or material condition to be identified;
(c) computing a spectral ratio $\alpha=(Q_{measured}/Q_{reference})$ for one or more known materials under one or more known conditions; and
(d) analysing the spectral ratios to identify the material and/or condition of the material in the borehole.

Embodiments of the present invention therefore provide a method that can be used to identify the presence and/or quality of a material such as cement in a borehole. It will be noted that the present invention may employ the so-called "spectral ratio method" in the analysis of a material in a borehole. Advantageously, embodiments of the invention can enable the quality of a material (e.g. cement plug) to be quantified over an interval between two surfaces (i.e. two tubulars or one tubular and the formation), taking into account the bond with both surfaces simultaneously. Furthermore, embodiments of the present invention can take into account the scattering and absorption of a signal along a path in the analysed layer by use of the reference values, which effectively enable these parameters to be calibrated. In addition, using the invention, the quality of the material (e.g. cement) bond can be defined in terms of intrinsic properties of the material.

Further advantages associated with aspects of the present invention include:

1. Improved data for post-cement job qualification/disqualification.
2. No need to remove a tubular in order to analyse material behind the tubular (as can be required with existing logging technology which is limited to an analysis of a cement bond to a single tubular)
3. Enabling logging in old wells and defining minimum criteria for plug and abandonment operations
4. Reducing cost for casing recovery (as it can remain in situ while the measurements are taken)
5. Reducing cost for plug and abandonment strategy
6. Reducing risk for wellhead fatigue investigation
7. Increasing well safety by allowing the recognition of outer casing fatigue more quickly and easily than current techniques
8. Proving information about the mechanical properties of a hidden material It will be understood that the spectral ratio will be in the closed interval [0,1]. Furthermore, if the measured and reference materials and conditions are similar the ratio will be close to 1. However, any imperfections, cracks, faults or degradation of the material in-situ will decrease the $Q_{measured}$ value and result in a ratio of less than 1. Thus, the higher the ratio, the higher the quality of the material downhole in comparison to the reference material.

It will be understood that the quality factor is sensitive to the variation of mechanical properties of the material and the presence of faults such as micro-cracks inside the material. Furthermore, the presence of cracks or any other mechanical inconformity in the material will manifest aggressively on the spectral ratios. Accordingly, the method can be used to distinguish between different types of materials (e.g. barite and cement) as well as between the same materials under different conditions (i.e. including more or less faults).

Aspects of the invention include how the quality factor can be used to define an acceptable limit for an impermeable barrier. For example, an annular media can be considered to be bonded by a material at both sides of the annulus if the spectral ratio between $Q_{measured}$ along any given (radial) path in the annulus and $Q_{reference}$ for the material is equal to one. Furthermore, a material may be considered as constituting an impermeable barrier if and only if the spectral ratio α is equal to one. However, there will also be a need to define an error limit or acceptable percentage deviation of the spectral ratio from 1, for which the material is still considered to form an impermeable barrier. This can be done experimentally. In addition, a barrier may be considered to have long term integrity if the degradation of the material (i.e. reduction in $Q_{measured}$ or the spectral ratio) over time is minimal.

It should be noted that if the material does not bond or adhere to the far wall of the annulus to form an impermeable barrier then the spectral ratio α will not be one. The present technique therefore allows for an analysis of the bond at the far wall of the annulus, which is not normally possible with existing techniques.

The method may comprise presenting the spectral ratios in an azimuthal map.

The step of measuring the downhole quality value may comprise use of a logging tool (e.g. an acoustic logging tool) to collect data along an investigated path through the material. The logging tool may comprise one or more acoustic sensors, which may require calibration.

The method may comprise determining quality factors and/or spectral ratios for both flexural waves (Qp) and shear waves (Qs). Accordingly, the method can take into account both types of attenuation.

The method may be performed to determine the presence and/or quality of cement either between first and second tubulars or between a first tubular and a wall of the borehole.

The method may comprise the use of a further material parameter to help to identify the material and/or condition of the material. The further material parameter may comprise one or more of: acoustic impedance, velocity, nonlinear elasticity or backscattering.

It will be understood that the quality factors ($Q_{reference}$ and $Q_{measured}$) effectively quantify the effects of anelastic attenuation (i.e. absorption) on a seismic wavelet caused by fluid movement and grain boundary friction of the material.

According to a second aspect of the invention there is provided a tool for measuring a downhole quality factor ($Q_{measured}$) of the material and/or material condition to be identified.

According to a third aspect of the invention there is provided a processor for identifying a material and/or condition of a material in a borehole, the material being either between first and second tubulars or between a first tubular and a wall of the borehole, the processor being configured for:

a) receiving a downhole quality factor ($Q_{measured}$) of the material and/or material condition to be identified and a reference quality factor ($Q_{reference}$) for one or more known materials in one or more known conditions;
b) computing a spectral ratio $\alpha=(Q_{measured}/Q_{reference})$ for one or more known materials under one or more known conditions; and
c) analysing the spectral ratios to identify the material and/or condition of the material in the borehole.

According to a fourth aspect of the invention there is provided an apparatus for identifying a material and/or condition of a material in a borehole, the material being either between first and second tubulars or between a first tubular and a wall of the borehole, the apparatus comprising:

(b) a tool for measuring a downhole quality factor ($Q_{measured}$) of the material and/or material condition to be identified;

(c) a processor for:

a) receiving $Q_{measured}$ and a reference quality factor ($Q_{reference}$) for one or more known materials in one or more known conditions;

b) computing a spectral ratio $\alpha=(Q_{measured}/Q_{reference})$ for one or more known materials under one or more known conditions; and c) analysing the spectral ratios to identify the material and/or condition of the material in the borehole.

Further aspects of the invention include apparatus for performing the method described above, a computer program for use in performing the method described above and a computer arranged to execute said computer program, to perform said method.

Aspects of the present invention may be employed alongside one or aspects of the applicant's co-pending application GB1412826.8, which is incorporated herein by reference.

By way of the invention, the quality of the cement bond of an outer casing/formation can be determined which is advantageous for the assessment of well integrity. The quality of the cement bond at both the first and second casings/interfaces can be obtained in one logging run. In turn, this can reduce costs in plug and abandonment operations and reduce casing recovery costs. Further advantages of the various features and embodiments the invention will be apparent from the description, drawings and claims.

Each of the aspects may have further features as described in any other aspect, or as described elsewhere in the description, drawings and claims. Features described in relation to one embodiment or aspect may be included in other embodiments or aspects, as an additional feature or in exchange for another like feature.

BRIEF DESCRIPTION OF THE DRAWINGS

There will now be described, by way of example only, embodiments of the invention with reference to the accompanying drawings, in which:

FIG. 10A is a graph of P-wave Q-value against P-wave characteristic impedance as measured for the materials used in the experimental set-up of FIG. 4 where the samples were provided in a fluid bath;

FIG. 10B is a graph of S-wave Q-value against S-wave characteristic impedance as measured for the materials used in the experimental set-up of FIG. 4 where the samples were provided in a fluid bath;

FIG. 11A is a graph of P-wave Q-value against P-wave velocity as measured for the materials used in the experimental set-up of FIG. 4 where the samples were provided in a fluid bath; and FIG. 11B is a graph of S-wave Q-value against S-wave velocity as measured for the materials used in the experimental set-up of FIG. 4 where the samples were provided in a fluid bath.

DETAILED DESCRIPTION OF CERTAIN EMBODIMENTS

Figure 1:
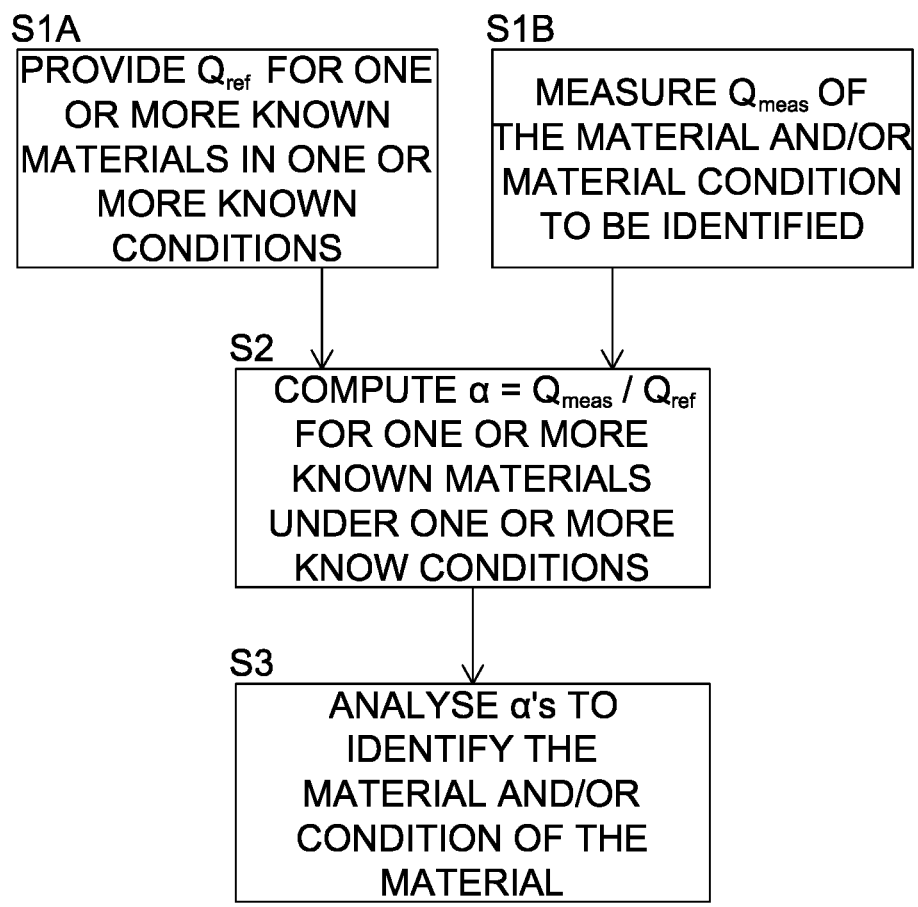
FIG. 1 is a flow chart of a method of identifying a material and/or condition of a material in a borehole in accordance with a first embodiment of the invention.

FIG. 1 shows a flow chart of a method of identifying a material and/or condition of a material in a borehole in accordance with a first embodiment of the invention. The method comprises the following process steps S1A to S3 (numbered correspondingly in the FIG. 1):

S1A. Provide a reference quality factor ($Q_{reference}$) for one or more known materials in one or more known conditions.

S1B. Measure a downhole quality factor ($Q_{measured}$) of the material and/or material condition to be identified.

It should be noted that steps S1A and S1B need not be performed in a particular order (for example, SIB could be performed before S1A). However, it is more likely that S1A will be performed first and $Q_{reference}$ stored in a computer memory or database.

S2. Compute a spectral ratio $\alpha=(Q_{measured}/Q_{reference})$ for one or more known materials under one or more known conditions.

S3. Analyse the spectral ratios to identify the material and/or condition of the material in the borehole.

The method may further comprise the step of presenting the results in an azimuthal map.

It will be understood that the method effectively employs the spectral ratio method to quantify the condition of a material in a borehole. Thus, in certain embodiments it is possible to use the method to determine the existence and/or quality (i.e. condition) of a material (e.g. cement) either between first and second tubulars or between a first tubular and a wall of the borehole.

The quality factors will be extracted from acoustic data which may be obtained from a logging tool such as that described with reference to FIG. 2.

The measured acoustic data will be calibrated against known samples (e.g. analysed in a laboratory) so that a quality factor can be extracted under known conditions (e.g. with good bonds at either side of a material annulus). The quality value $Q_{reference}$ will therefore be uniquely defined for a given material composition in known conditions. A number of different $Q_{reference}$ values may be determined for different materials/compositions and/or different conditions (e.g. incomplete bonding, including cracks etc.).

Once the quality factor ($Q_{measured}$) has been extracted from in-situ measured waveforms the spectral ratio will be computed in accordance with Equation 1 below.

$$\alpha = (Q_{measured}/Q_{reference}) \quad [1]$$

It will be understood that the spectral ration α will be in the closed interval [0-1] and any degradation of material downhole will make the $Q_{measured}$ value decrease when compared to the calibrated value $Q_{reference}$.

In some embodiments, the quality factors and/or spectral ratios will be determined for both flexural waves (P-waves) and shear waves (S-waves) so that both forms of attenuation are considered.

Figure 2:
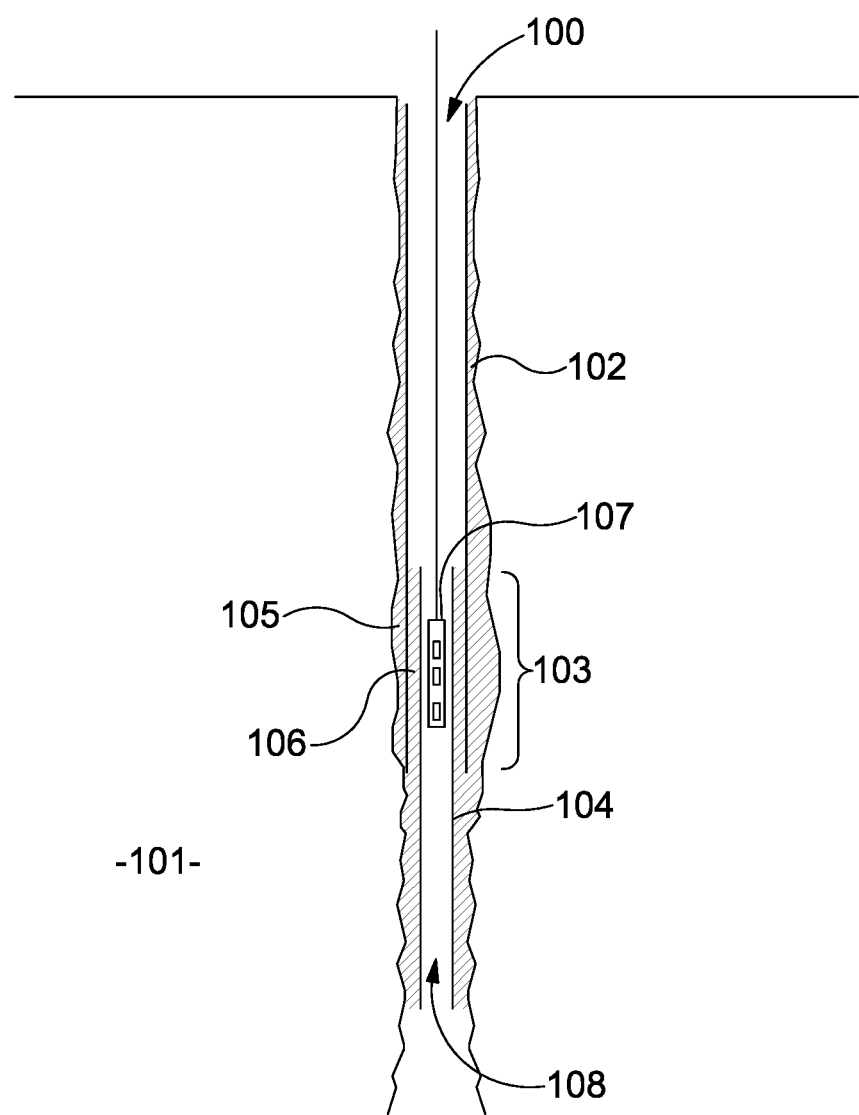
FIG. 2 is an overview representation of a borehole including a tool for measuring a downhole quality factor ($Q_{measured}$) of the material and/or material condition to be identified in accordance with an embodiment of the invention.

FIG. 2 shows a double casing scenario where a borehole 100 is shown as extending into the geological subsurface of the Earth. The borehole 100 is cased with two casings 102, 104 constituting outer and inner tubulars, respectively, having different diameters, and overlapping with each other in the region 103 of the borehole. The respective casings 102, 104 have surrounding annular spaces 105, 106 adjacent to their outer surfaces. The space 105 is defined between the casing and formation 101, whilst the space 106 is defined between the inner surface of the casing 102 and the outer surface of the casing 104. During casing of the borehole, cement is introduced into the borehole and directed into these annular spaces 105, 106 to install the casings, with the intention that the cement seals the borehole from the formation and helps with containing fluid and controlling pressure of fluid in the borehole. In FIG. 2, cement is present in the annular spaces 105, 106. As will be appreciated however, the cement bond may not be perfect in all places.

In order to survey or evaluate the quality of the bond of the cement, in particular the bond of the cement against the surfaces of outer casing 102 and the formation 101, an ultrasonic bond logging tool 107 is run into the borehole in the region 103. The tool 107 is located in the borehole space 108 and may be configured in the same manner as described in the applicant's co-pending application GB1412826.8. The tool is used to transmit ultrasonic pulses in the frequency range of 100-700 kHz from a source into the wall of the borehole in the region 103, so as to generate Lamb wave modes. The ultrasonic pulses may be transmitted at an angle between 0 and 90 degrees with respect to the longitudinal axis of the borehole. Receivers arranged on the tool are used to detect return energy from the medium interfaces in response to the transmissions, including returns due to the leaky P wave interacting with the second casing or outer tubular 102. The corresponding third interface echo (TIE) event is recorded and is used to determine the Q value using any standard techniques. It should be noted that the present invention is not limited to use with the tool described in GB1412826.8 but can be applied to any data, however obtained, as long as the data includes the TIE.

In general, the Q value quantifies the energy loss during the propagation of an acoustic wave along a path in-between two recorded events. The events may be placed in time or by inversion in space. One can use known definitions for energy loss and can determine that the wave energy loss is proportional with the square of the recorded amplitude. In this sense, the inelastic properties of the media will be quantified by the Q value (which is non-dimensional). A small Q value will correspond to a high attenuation. Further (non-limiting) details of how the Q value may be calculated are provided below in relation the Experimental Results.

Figure 3:
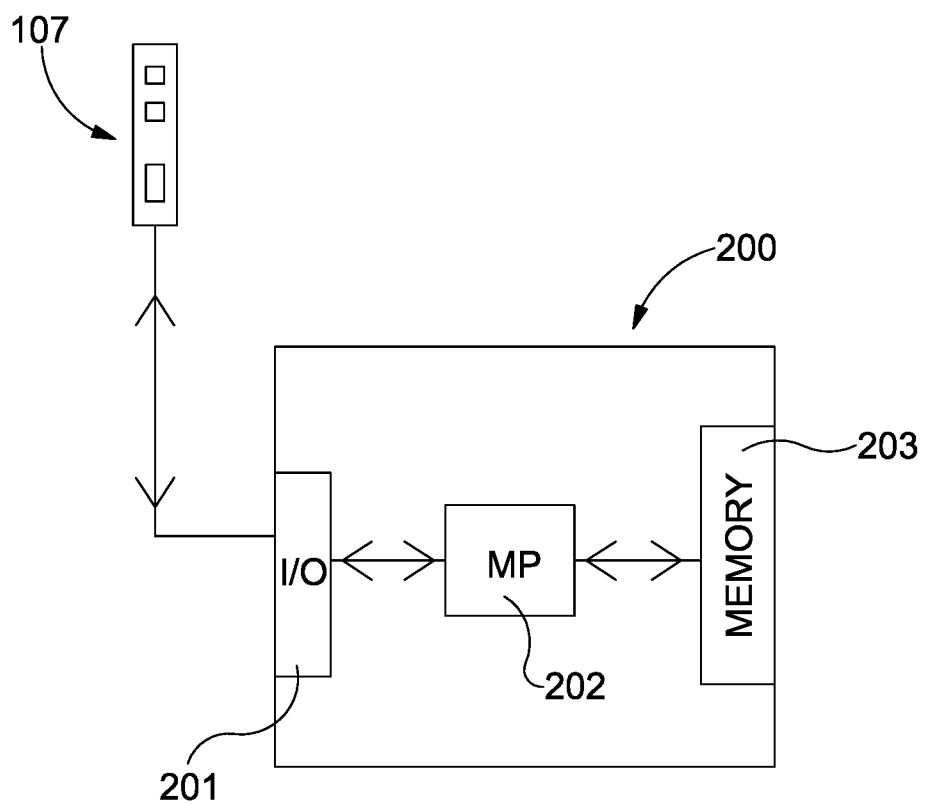
FIG. 3 is a schematic representation of a computer device for use in carrying out the method of FIG. 1.

Referring to FIG. 3, there is shown a computer device 200. The computer device 200 has an Input/output device 201 used for communicating with a detector and/or transmitter of the tool 107. The computer device also has a processor 202 (e.g. microprocessor MP) arranged to process or execute instructions as for example defined by a computer program configured to carry out the method of FIG. 1. The processor 202 may also process data received from the detector and process data or instructions for sending to the detector and/or transmitter. The computer device further comprises a memory 203, which may be used for storing data, such as may be obtained from the detector and/or determined in a lab for reference samples, for example in one or more databases. The memory may also contain a computer program with instructions for processing the response data and signals associated with the waves returned from the borehole wall in response to the ultrasonic wave transmission. The computer device 200 may comprise a distributed arrangement for example with wireless communication between components or with communication across a network. In addition, the computer device 200 may be located at a surface location and may communicate with the borehole tool transmitter and/or receiver whilst the borehole tool is in use in the borehole.

By way of the method and apparatus described, it is possible to quantify the cement bond of an interval behind a second (outer) tubular or casing with a tool deployed inside a first (inner) tubular or casing. In some embodiments the invention may be employed where the inner tubular is production tubing surrounded by fluid and a cemented outer tubular in the form of casing. In other embodiments, the invention may be employed where the inner tubular and outer tubular are both cemented casings. In fact, the inner and outer tubulars may be constituted by any generally cylindrical barriers and the medium surrounding each tubular may be solid (e.g. cement or formation), liquid (e.g. water) or gas.

The present technique may take account of the scattering and absorptions of the signal along the path in the analysed layer by taking into account both types of attenuation: shear wave attenuation and flexural wave attenuation. Calibration can be provided in terms of scattering and absorptions.

Experimental Results

A number of experiments have been carried out in connection with the present invention and these are described below to help to illustrate particular embodiments and/or aspects of the invention.

Material Properties

The following materials were chosen for the experiments:
Cement: 2 types
Shale: Mancos and Pierre
Sandstone: Berea
Marble: Dionysos
Chalk: Mons
Barite The rock and cement samples were saturated with kerosene, but the shales were saturated with Marcol. All samples were machined to achieve as uniform thickness as possible to avoid angular reflection at any boundaries, and ensure good contact between a buffer and the sample.

Material properties for the materials are presented in Table 1 below. As it was not part of the experiments to determine any material properties these are approximate numbers for samples of the same type of rock. Mineralogy is presented in Table 2, while the dimensions and weight of the samples used are given in Table 3 and Table 4, respectively for samples used a solid buffer load frame and fluid bath.

TABLE 1

Material properties (*Angle measured between the sample axis and the bedding plane normal.)

| Rock | Type | Porosity [%] | Density (saturated) (g/cm³) | UCS [Mpa] | Grain size | Sample orientation |
|---|---|---|---|---|---|---|
| Berea | Sandstone | 19-24 | 2.35 | 30-65 | Medium | — |
| Mons | Chalk | 44 | 1.88 | 10-13 | Small | — |
| Mancos | Shale | 8 | 2.57 | 50-80 | Small | 90°* |
| Pierre | Shale | 16-33 | 2.39 | 7-13 | Small | 0°* |
| Dionysos | Marble | — | 2.72 | 90.3 | Small | — |

TABLE 2

Mineralogy. Note, this data is taken from similar rocks and is not representative of the specific samples tested in these experiments. Data for the Dionysos sample was not available.

| Rock | Quartz | K-fsp. | Plag. | Chl. | Kaol. | Mic/Ill | ML | Smect | Calc | Sid | Dol/Ank | Pyr |
|---|---|---|---|---|---|---|---|---|---|---|---|---|
| Pierre Shale | 25.65 | 0.60 | 13.20 | 1.80 | 4.50 | 13.90 | 0.20 | 28.55 | 2.10 | 0.70 | 3.60 | 2.20 |
| Mancos Shale | 43.60 | 7.10 | 3.60 | 0.00 | 3.80 | 10.80 | 9.30 | — | 8.60 | 0.40 | 10.90 | 1.90 |
| Mons Chalk | — | — | — | — | — | — | — | — | 99.20 | 0.20 | — | 0.60 |
| Berea Sandstone | 72.10 | 7.40 | 2.20 | Trace | 6.70 | 2.90 | — | — | 0.10 | 1.30 | 7.30 | — |

TABLE 3

Test sample dimensions and weight (saturated samples) for samples used in a solid buffer load frame with frequencies 250 kHz-1 MHz.

| Material | Diameter (mm) | Thickness (mm) | Weight (g) |
|---|---|---|---|
| Cement 1 | 99.8 | 34.72 | 528.13 |
| Cement 2 | 99.9 | 30.73 | 468.63 |
| Mancos | 99.9 | 30.95 | 623.77 |
| Pierre | 99.5 | 30.65 | 569.56 |
| Dionysos | 99.7 | 53.76 | 1141.5 |
| Mons | 99.4 | 30.20 | 440.43 |
| Berea | 99.8 | 26.37 | 484.56 |
| Barite | 79.9 | 15.10 | 222.17 |

TABLE 4

Test sample dimensions and weight (saturated samples) for samples used in a fluid bath with frequencies 5-10 MHz.

| Material | Diameter (mm) | Thickness (mm) | Weight (g) |
|---|---|---|---|
| Cement 1 | 37.9 | 5.50 | 12.20 |
| Cement 2 | 37.9 | 6.01 | 13.57 |
| Mancos | 37.8 | 6.16 | 18.08 |
| Pierre | 37.6 | 6.13 | 16.14 |
| Dionysos | 37.9 | 8.73 | 26.52 |
| Mons | 37.4 | 5.89 | 12.39 |
| Berea | 37.9 | 6.51 | 17.28 |

As can be seen from Tables 3 and 4, the samples prepared for measurements with solid buffers in a load frame in the frequency range 250 kHz-1 MHz had an approximate diameter of 100 mm and thickness of about 30 mm. The samples prepared for measurements submersed in fluid in the frequency range 5 MHz-10 MHz had an approximate diameter of 38 mm and thickness of about 6 mm.

Preparation of Cement

The cement paste was prepared by mixing 500 grams of dry cement powder with 220 grams of water in a Waring blender. The cement was added to the water while the mixing blade was rotating at a velocity of 4000 rpm. After all the cement was added the sample was mixed for 35 seconds at a mixing velocity of 16000 rpm. The cement paste was poured into plastic beakers and left to cure at 66° C. in either ambient pressures (type 1) or at a pressure of 50 MPa (type 2).

Preparation of Concentrated Barite Samples

In a beaker containing 400 mL of drilling fluid, barite particles were added sequentially under stirring. In total 1400 grams of barite was added to the suspension. After the final addition of barite the sample was left to mix with a propeller rotation velocity of 500 rpm for 30 minutes.

Speed of Sound and Attenuation Pulse Echo

Figure 4:
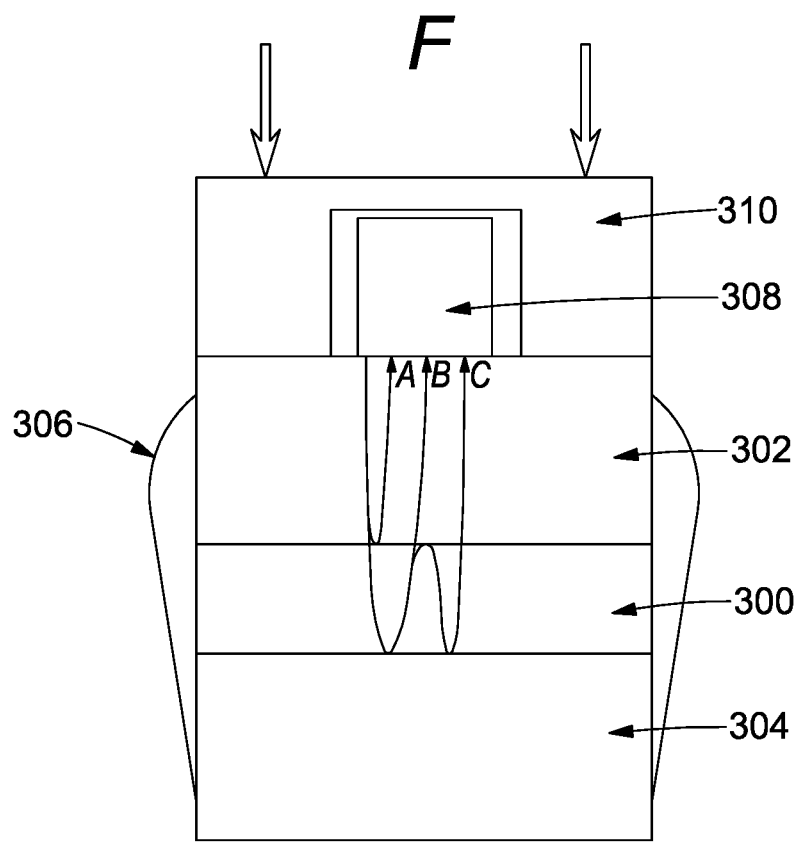
FIG. 4 is a schematic representation of an experimental set-up for measuring $Q_{reference}$ for a range of materials.

The pulse echo setup is primarily used to measure attenuation in solid materials, but also velocity. The setup is shown in FIG. 4 where the material sample 300 is provided between an upper and a lower solid buffer 302, 304. However, for fluid bath measurements, an oil-filled sleeve 306 is provided around the sample 300 and buffers 302, 304. A transducer 308 is mounted above the upper buffer 302 and is enclosed in a metal casing 310. A load of force F may be applied to the metal casing 310 to apply pressure to the sample under test.

During the experiments, the transducer 308 transmits an acoustic pulse which propagates through the upper buffer 302 and sample 300 such that there is an echo (or reflection) from each material interface. The present experiments make use of 3 echoes, indicated as A, B, and C in FIG. 4, and from these 3 measurements one can estimate the speed of sound, attenuation, and characteristic impedance of the sample.

More specifically, Echo A is the pulse reflected from the interface between the upper buffer 302 and the sample 300. Echo B is the pulse travelling through the sample 300 and reflecting back from the interface between the sample 300 and the back buffer 304. Echo C is the pulse re-reflected inside the sample 300 so that it reflects twice from the interface between the sample 300 and the back buffer 304.

In several of the materials investigated echo C is not available due to high attenuation of the acoustic signal. The data presented is therefore based on echoes A and B. The reflection coefficient is estimated through comparison of echo A with a reference echo, where the sample is replaced with a reference material. The reference material used here was air. The characteristic impedance was computed from the reflection coefficient, but can also be found as the product of density and velocity.

The measurements were carried out in the transducers' near field or close to near field range. Diffraction differences due to different propagation lengths of the pulses were corrected as described below.

In order to acquire adequate echoes proper coupling was essential. Coupling can be achieved with a fluid like coupling medium (i.e. the oil-filled sleeve 306), but it was experienced that high axial pressure on the materials stack and between the transducers and the buffers was also important.

It should be noted that the present experiments were not able to estimate reliable attenuation parameters for shear waves. It is believed that the results could be improved, for example, by better coupling or by using larger diameter samples so that the side reflecting surfaces will be further away from the measuring point.

Diffraction Correction

Diffraction correction is given by the diffraction integral as per Equation 2 below $$D(S) = 1 - e^{-i2\pi/S}[J_0(2\pi/S) + iJ_i(2\pi/S)] \quad [2]$$

where $S = \lambda z/a^2$ is normalized distance, $\lambda$ is wavelength, z is propagation length, a is the transducer's radius and $J_0$ and $iJ_i$ are Bessel functions of the first kind. When travelling through multiple materials the normalized distance becomes $S = \Sigma_i \lambda_i z_i / a^2$ where the index i indicates material.

Pulses corrected for diffraction correction are $A' = A/(S_A)$ and $B' = B/D_L(S_B)$.

Speed of Sound

The speed of sound was evaluated through the ratio of the propagation length through the sample, 2L, and the difference of arrival time of the echoes A' and B', $\Delta t$. $v = 2L/\Delta t$. This was evaluated in the time domain and the frequency domain.

In the time domain two methods can be used to evaluate the velocity:

1) First break—in which the arrival time is defined as the time at which a specified level on a Ricker wavelet fitted to a first part of the recorded pulse is reached; and 2) First extrema—in which the arrival time is defined as the time of first extremum of the recorded pulse.

For both methods a predefined noise level is set and the recorded signal needs to be elevated above the noise level. For situations with poor single to noise ratio the first extrema may be buried in the noise. However, in the present experiments the "First extrema" was the default method used for measurement of velocity with the samples in solid buffers.

In the frequency domain the speed of sound was evaluated through the phase difference between the A' and B' echoes, $\varphi_{A'B'}$. This way one can evaluate the frequency dependent speed of sound as per Equation 3 below.

$$v(\omega) = \omega 2L/\varphi_{A'B'} \quad [3]$$

In practise it is difficult to find $\varphi_{A'B'}$ directly as the pulse used has a finite bandwidth and the phase is determined by unwrapping multiple $2\pi$ rotations of the phase with frequency. Here, the average linear phase in the adequate frequency range of echo B was used—in practise this represents the average group velocity.

Attenuation

The attenuation is developed in the frequency domain as per equations 4, 5 and 6 below.

$$\alpha = \frac{1}{2L} \ln\left[\frac{|A'(\omega)||R_{12}|}{|B'(\omega)||R_{23}|} T_{12} T_{21}\right] = \frac{1}{2L} \ln\left[\frac{|A'(\omega)||R_{12}|}{|B'(\omega)||R_{23}|}(1 - R_{12}^2)\right], \frac{\text{Np}}{\text{m}} \quad [4]$$

$$\alpha' = \frac{1}{200L} 20 lg\left[\frac{|A'(\omega)||R_{12}|}{|B'(\omega)||R_{23}|}(1 - R_{12}^2)\right], \frac{\text{dB}}{\text{cm}} \quad [5]$$

$$Q = \frac{\omega}{2v\alpha} \quad [6]$$

where $\alpha$ and $\alpha'$ are the attenuation coefficients, Q is the quality factor, $R_{12}$, $R_{23}$, $T_{12}$, $T_{21}$ are the reflection and transmission coefficients, where indices indicate material number, 1 is the upper buffer, 2 is the sample, and 3 is the lower buffer. The order of indices indicates direction of the pulse, e.g. $T_{12}$ is a transmission coefficient from the upper buffer to the sample. It should also be noted that L is the distance between the face of transducer and the reflector (i.e. the TIE reflector). Because the wave has to travel to the reflector and back to the transducer the total path length is 2L.

Characteristic Acoustic Impedance

The characteristic acoustic impedance is $Z = \rho v$ and is closely related to the velocity. The measured impedances are presented in FIGS. 5A and 5B, for P-waves and S-waves, respectively. In each case the data was obtained in the frequency range 250-1000 kHz using the solid buffer arrangement of FIG. 4 with the samples submersed in Kerosene.

From these results, it can be observed that each material tested has a characteristic impedance that only varies slightly with frequency. This is similar to the axial velocity data which is not presented here. However, particularly for P-wave impedance, the actual impedance values for some of the materials are very close. Accordingly, due to measurement inaccuracies and error bands, it may not be possible to distinguish between certain materials on the basis of the P-wave impedance alone. This is true for the Barite and Mons samples as well as the Pierre, Berea, Cement 1 and Cement 2 samples. In each case, an impedance value of 6 plus or minus 2 Mray could indicate the material of any of these 6 samples. Thus, impedance measurements alone are considered insufficient to determine a material and/or condition of a material in a wellbore.

It was also determined that the characteristic impedance is dependent on axial stress in the same manner as velocity.

Attenuation

The attenuation results are presented both as attenuation coefficients (dB/cm) and Q-value. The attenuation coefficient is expected to be strongly frequency dependent, while the Q-value will be constant with frequency if the attenuation constant shows a linear slope with frequency.

Figures 6A, 6B:
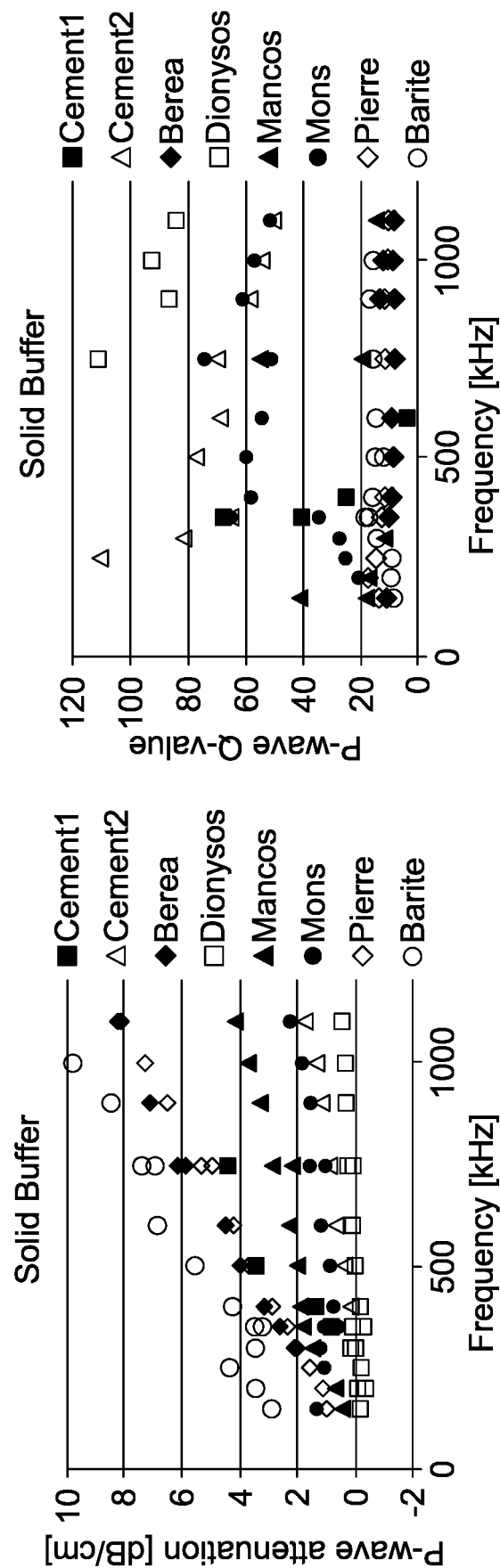
FIG. 6A is a graph of P-wave attenuation against frequency as measured for the materials used in the experimental set-up of FIG. 4 where the samples were provided in a solid buffer with 1 MPa axial stress.
FIG. 6B is a graph of P-wave Q-value against frequency as measured for the materials used in the experimental set-up of FIG. 4 where the samples were provided in a solid buffer with 1 MPa axial stress.
Figure 7A:
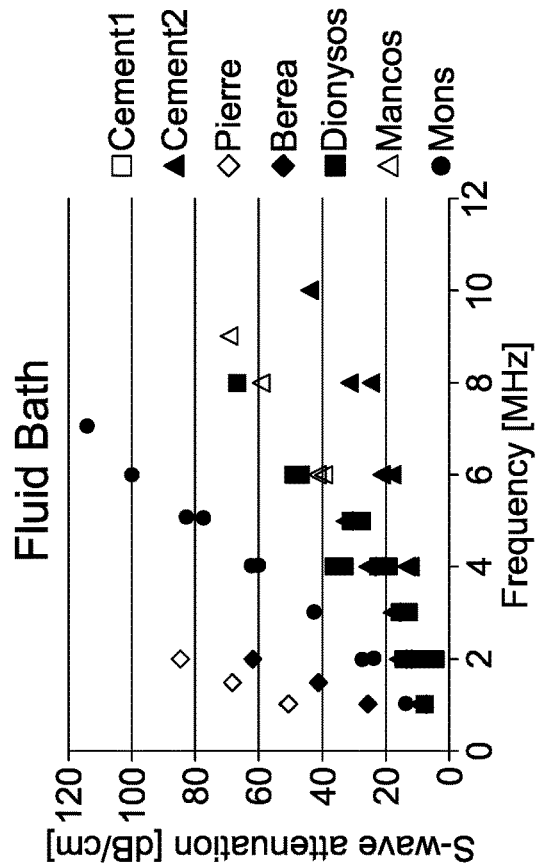
FIG. 7A is a graph of P-wave attenuation against frequency as measured for the materials used in the experimental set-up of FIG. 4 where the samples were provided in a fluid bath.
Figure 7B:
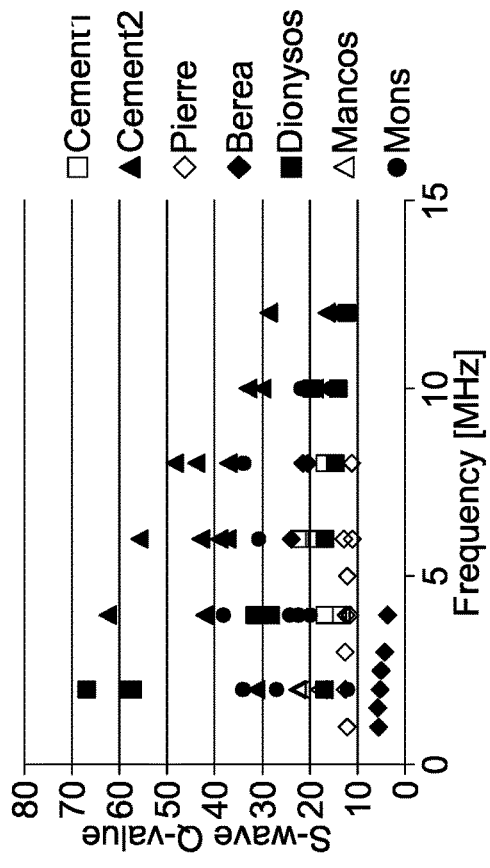
FIG. 7B is a graph of P-wave Q-value against frequency as measured for the materials used in the experimental set-up of FIG. 4 where the samples were provided in a fluid bath.
Figure 8A:
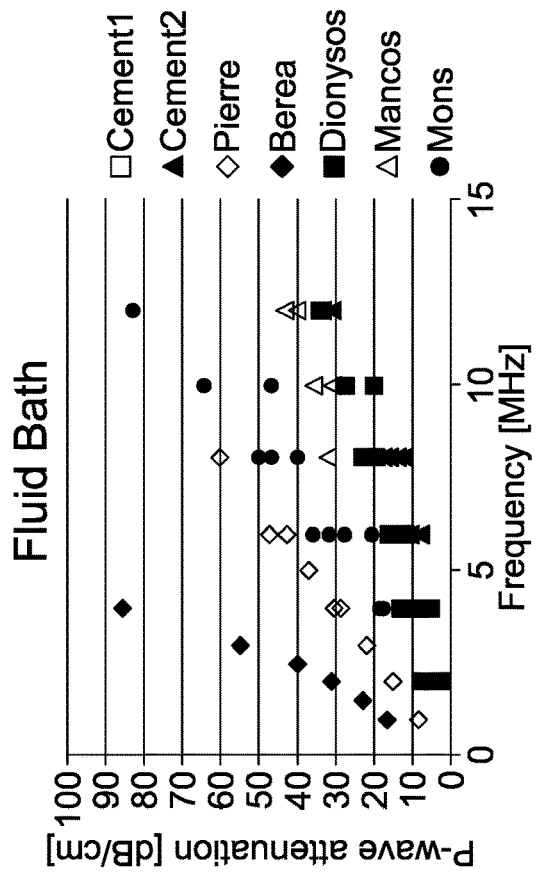
FIG. 8A is a graph of S-wave attenuation against frequency as measured for the materials used in the experimental set-up of FIG. 4 where the samples were provided in a fluid bath.
Figure 8B:
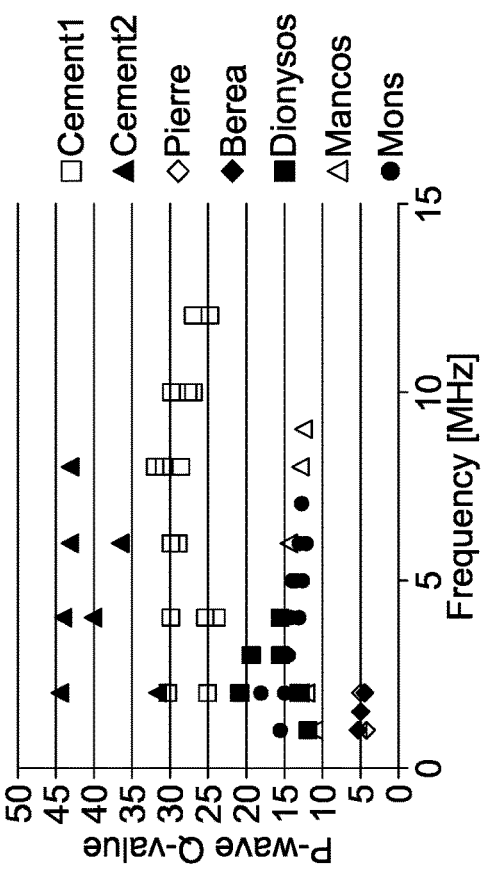
FIG. 8B is a graph of S-wave Q-value against frequency as measured for the materials used in the experimental set-up of FIG. 4 where the samples were provided in a fluid bath.

In FIGS. 6A and 6B P-wave attenuation and Q-value is presented as measured in the solid buffer set-up of FIG. 4.

Only the results taken with 1 MPa axial stress are presented in this figure. At the lowest frequencies, around 250 kHz, the Cements (especially Cement type 1) and Dionysos have low attenuation, even negative values. Thus, the Q-value is high or negative and is not included in the Q-value plot in those instances.

In FIGS. 7A, 7B, 8A and 8B P-wave and S-wave attenuation and Q-values are shown as a function of frequency for experiments performed in fluid bath. These measurements were performed in a fluid bath with 5 and 10 MHz transducers, thus data in the range 1.5-12 MHz is achieved. At these higher frequencies clear trends for each material can be seen.

One can observe that the quality factor (Q-value) is for some materials is clearly not constant with frequency, indicating an attenuation coefficient which is not linear with frequency. This may be due to low losses for these materials (e.g. Dionysos and Mons), but could also be due to the inner structure of the materials, as scattering is believed to be the dominant source of attenuation for these materials, and the scattering will be correlated with the structure of the materials.

Figure 5A:
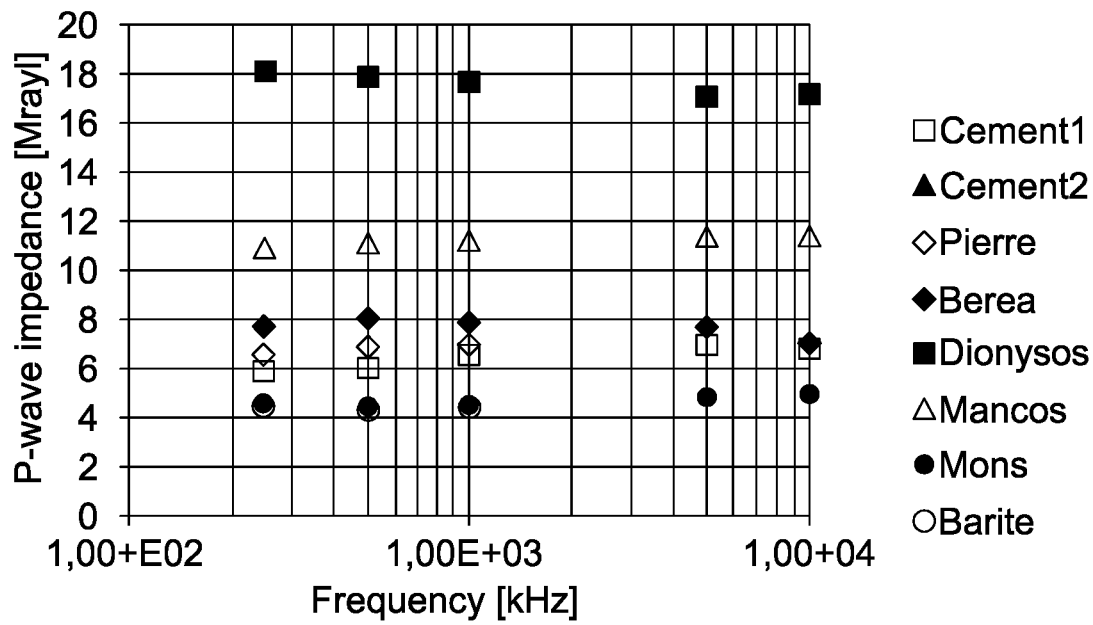
FIG. 5A is a graph of P-wave impedance against frequency as measured for the materials used in the experimental set-up of FIG. 4.
Figure 5B:
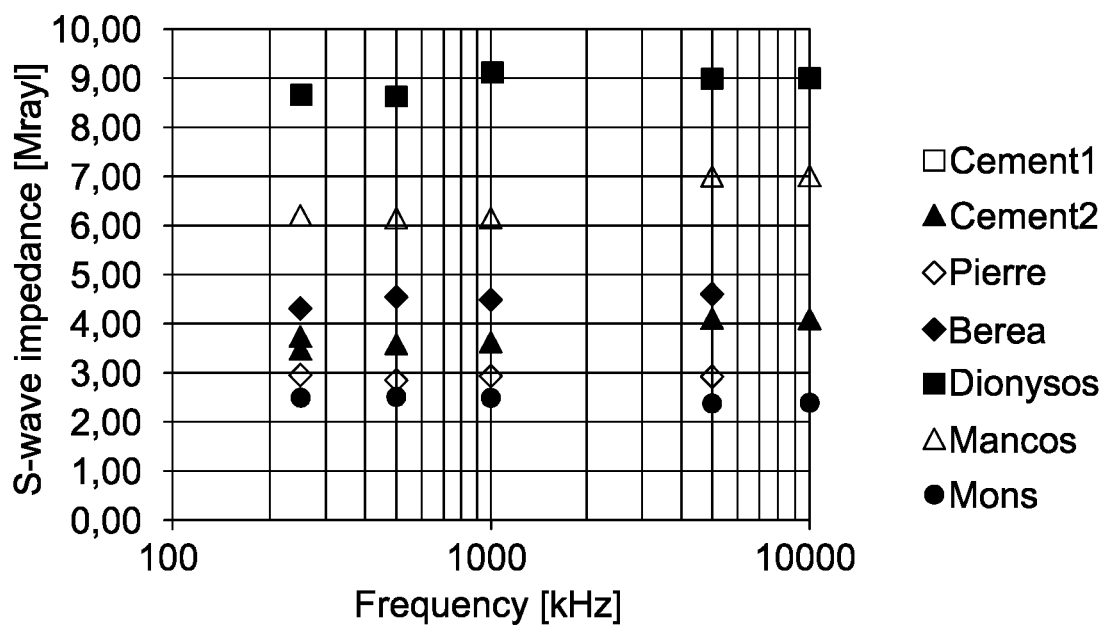
FIG. 5B is a graph of S-wave impedance against frequency as measured for the materials used in the experimental set-up of FIG. 4.

However, it is believed that the Q-values (P-wave and S-wave Q values) of the materials are, in general, more easily distinguishable than the impedance values discussed above (and, in particular the P-wave impedance values shown in FIG. 5A). It is therefore believed that calculating spectral ratios using measured and reference Q-values, in accordance with embodiments of the present invention, will provide a more useful method for identifying a material and/or condition of a material in a wellbore.

Further Analysis

Figure 9A:
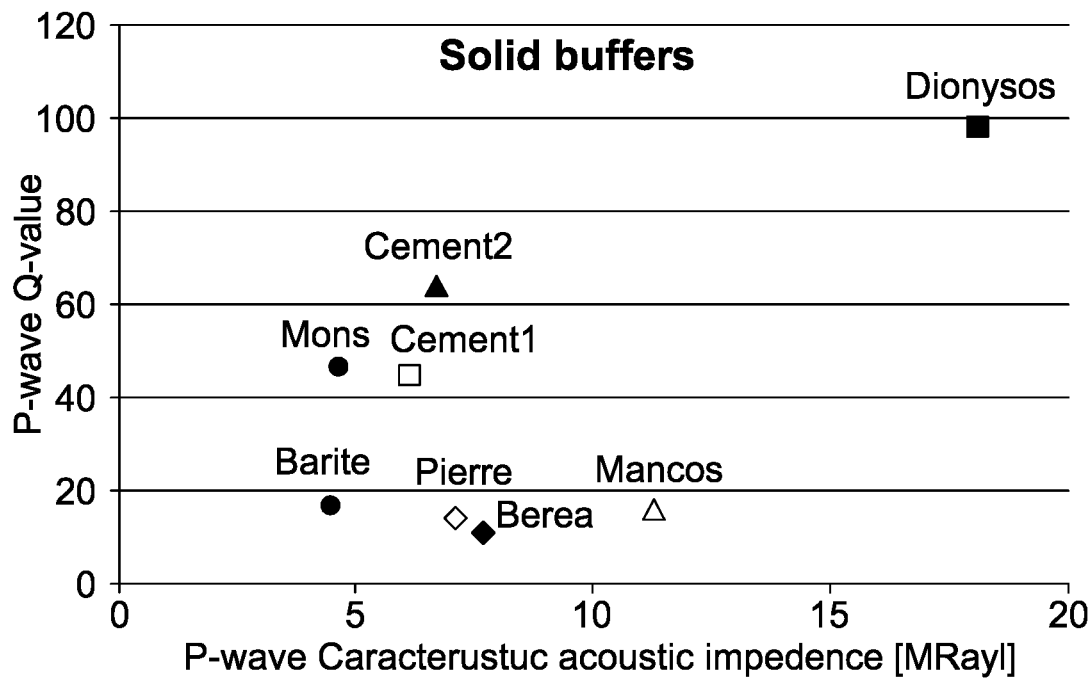
FIG. 9A is a graph of P-wave Q-value against P-wave characteristic impedance as measured for the materials used in the experimental set-up of FIG. 4 where the samples were provided in a solid buffer.
Figure 9B:
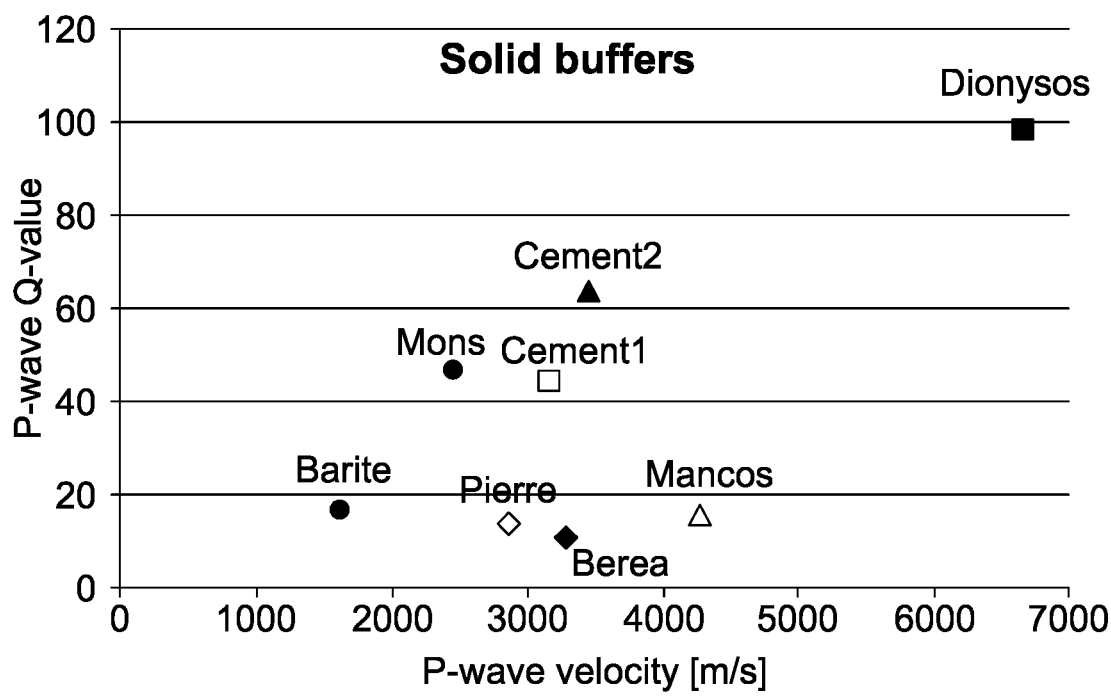
FIG. 9B is a graph of P-wave Q-value against P-wave velocity as measured for the materials used in the experimental set-up of FIG. 4 where the samples were provided in a solid buffer.

To supplement the determination of material type from measurements one could use more than 1 parameter, as shown in FIGS. 9A and 9B. In these figures acoustic impedance or velocity is plotted against average Q value for each of the samples tested in solid buffers. From this data, one can observe that the materials are distributed over the 2 dimensions, and it is relatively easy to distinguish between, for example, Cement 1, Cement 2, Pierre, and Berea, which all have similar acoustic impedance but different Q-values. Other parameters that could be used to aid material detection/identification is nonlinear elasticity (through e.g. nonlinear delays) and backscattering analysis.

The attenuation or level of observed echoes or waves penetrating the tubulars and annulus in a borehole will be dependent on the boundary conditions of the domain the wave has passed through. Measurement of attenuation in-situ can be done with existing equipment if a model of the wave propagation with boundary conditions is established. On the other hand, attenuation can be determined by local measurements of the volume backscattering of the material itself. As described above it seems as a quite accurate estimate of the attenuation can be found using a very simple model of the wave propagation and the equipment used.

FIGS. 10A, 10B, 11A and 11B show acoustic impedance or velocity plotted against average Q-value for both P and S waves each of the samples tested in fluid baths. As above, the data allows clear identification of the material being tested from the combination of the properties presented.

The present results show that the Q-value may be a more accurate parameter than impedance to use to determine a material type and/or condition. Furthermore, the parameters of the different materials tested span over a wide range and indicate that measurements of more than one parameter will result in more robust estimate of material type and probably also its state.

Various modifications and improvements may be made without departing from the scope of the invention herein described. In particular, although the description has been made referring to a region in which there are two tubulars (e.g. casings), it will be appreciated that further tubulars may be used in other variants of the invention, where for example the first and second casings described above are arranged within another casing (or casings) which is adjacent to the formation wall, and the invention may be applied to determine the quality of the cement bond on the exterior of the casing nearest to the formation. It can also be noted that production tubing may take the place of the first casing, with the tool located inside the production tubing. The method can then be performed in the same way, except with the transmission of energy through the production tubing, to allow the cement bond evaluation of the second casing (which may be the only tubular or the second tubular outside the production tubing), in the manner described above.

The invention claimed is:

1. A method of identifying a material and/or condition of a material in a borehole, the material being either between first and second tubulars or between a first tubular and a wall of the borehole, the method comprising the steps of:
    (a) providing a reference quality factor ($Q_{reference}$) for one or more known materials in one or more known conditions;
    (b) measuring a downhole quality factor ($Q_{measured}$) of the material and/or material condition to be identified;
    (c) computing a spectral ratio $\alpha=(Q_{measured}/Q_{reference})$ for one or more known materials under one or more known conditions; and
    (d) analyzing the spectral ratios to identify the material and/or condition of the material in the borehole.

2. The method according to claim 1, further comprising presenting the spectral ratios in an azimuthal map.

3. The method according to claim 1, wherein the step of measuring the downhole quality value comprises use of a logging tool to collect data along an investigated path through the material.

4. The method according to claim 3, wherein the logging tool comprises one or more acoustic sensors.

5. The method according to claim 1, comprising determining quality factors and/or spectral ratios for both flexural waves (Qp) and shear waves (Qs).

6. The method according to claim 1, performed to determine the presence and/or quality of cement either between first and second tubulars or between a first tubular and a wall of the borehole.

7. The method according to claim 1, comprising the use of a further material parameter to help to identify the material and/or condition of the material.

8. The method according to claim 7, wherein the further material parameter comprises one or more of: acoustic impedance, velocity, nonlinear elasticity or backscattering.

9. The method according to claim 1, further comprising:
    transmitting an ultrasonic wave from an emitter provided within the bore of the first tubular; and
    at an acoustic sensor provided within the bore of the first tubular, measuring return energy of the ultrasonic wave which has propagated through the first tubular and through the material, and which return energy has been returned at the interface between the material and the second tubular or the interface between the material and the wall of the borehole; wherein the reference quality factor quantifies attenuation of an ultrasonic wave in said one or more known materials; determining a downhole quality factor ($Q_{measured}$) of the material and/or material condition to be identified from said measuring, wherein the downhole quality factor quantifies the attenuation of said portion of the ultrasonic wave within the material.

10. An apparatus for performing the method of claim 1.

11. A computer program embodied on a non-transitory computer readable medium for use in performing the method of claim 1.

12. A computer arranged to execute a computer program to perform the method of claim 1.

13. A processor for identifying a material and/or condition of a material in a borehole, the material being either between first and second tubulars or between a first tubular and a wall of the borehole, the processor being configured for:
   a) receiving a downhole quality factor ($Q_{measured}$) of the material and/or material condition to be identified and a reference quality factor ($Q_{reference}$) for one or more known materials in one or more known conditions;
   b) computing a spectral ratio known materials $\alpha = (Q_{measured}/Q_{reference})$ for one or more under one or more known conditions; and
   c) analyzing the spectral ratios to identify the material and/or condition of the material in the borehole.

14. An apparatus for identifying a material and/or condition of a material in a borehole, the material being either between first and second tubulars or between a first tubular and a wall of the borehole, the apparatus comprising:
   (a) a tool for measuring a downhole quality factor ($Q_{measured}$) of the material and/or material condition to be identified; and
   (b) a processor for:
      i) receiving $Q_{measured}$ and a reference quality factor ($Q_{reference}$) for one or more known materials in one or more known conditions;
      ii) computing a spectral ratio $\alpha = (Q_{measured}/Q_{reference})$ for one or more known materials under one or more known conditions; and
      iii) analyzing the spectral ratios to identify the material and/or condition of the material in the borehole.

* * * * *